UNITED STATES PATENT OFFICE.

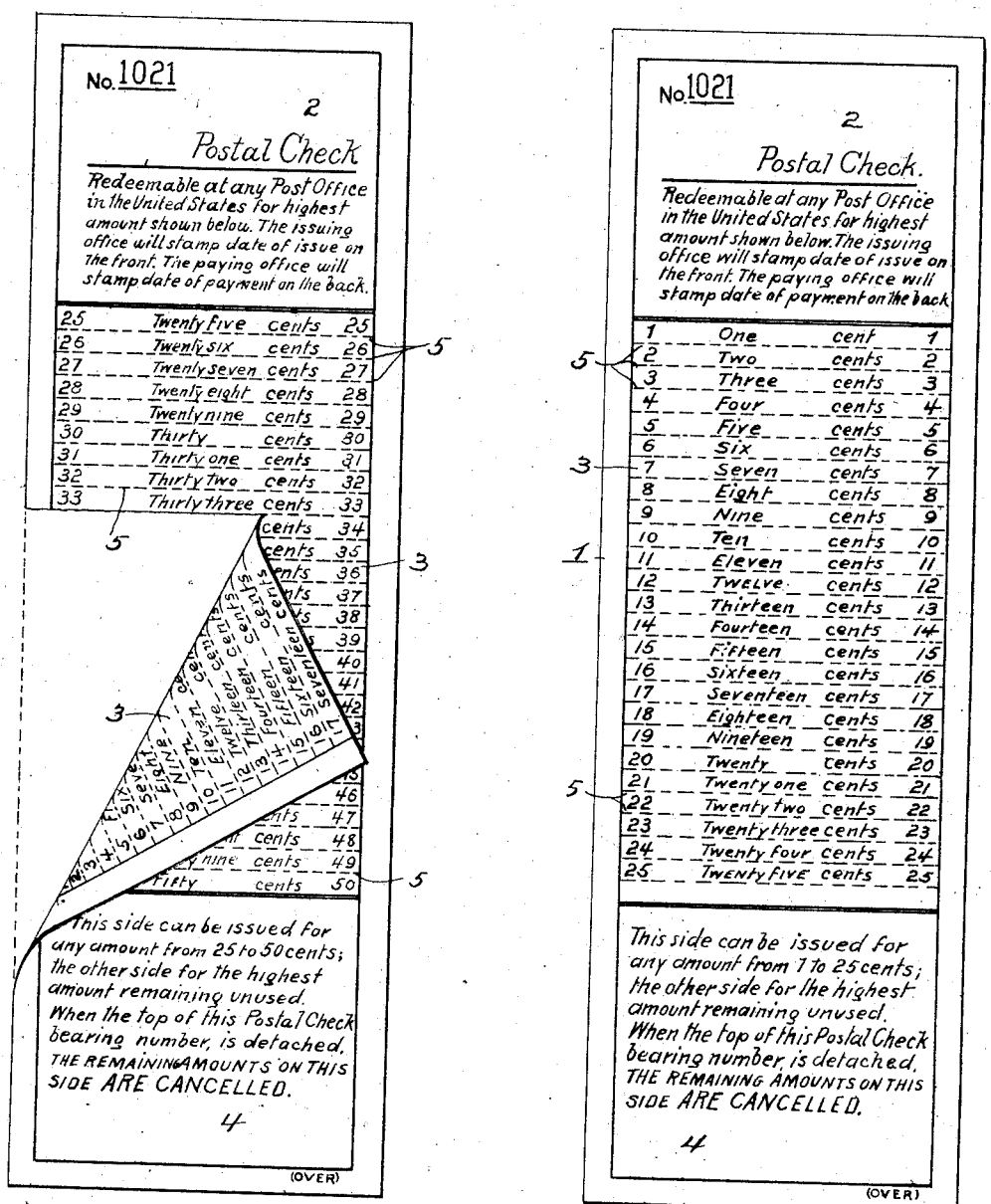

JOHN C. BELL, OF CLEVELAND, OHIO.

CHECK.

No. 883,380.      Specification of Letters Patent.      Patented March 31, 1908.

Application filed April 21, 1906. Serial No. 313,053.

*To all whom it may concern:*

Be it known that I, JOHN C. BELL, a resident of Cleveland, in the county of Cuyahoga and State of Ohio, have invented certain new and useful Improvements in Checks; and I do hereby declare the following to be a full, clear, and exact description of the invention, such as will enable others skilled in the art to which it appertains to make and use the same.

My invention relates to an improved check, adapted particularly for use in transmitting small amounts of money through the mails,—one object of the invention being to provide simple means whereby the use of postage stamps or coins in making small remittances can be avoided.

A further object is to provide a device which can be issued by the Post Office Department as a postal check or order for small amounts of money, in lieu of money orders now commonly in use, and which can be sold by the Department to business men or others for use in transmitting small remittances, and which can be redeemable by the Department for their face value.

A further object is to provide a postal or remittance check to be issued and redeemed by the Post Office Department, and which may be used in whole or in part in transmitting small remittances from place to place, and which shall be so constructed and arranged that an unused or fractional portion of a check can be utilized.

A further object is to construct and arrange the check in such manner that any fractional part of it can be used in making one remittance and the remaining part utilized in making another remittance to some other person or at some future time.

With these objects in view, the invention consists in certain novel features and arrangements of a check as hereinafter set forth and pointed out in the claims.

In the accompanying drawings, Figure 1 is a view of a check embodying my invention and showing portions of both sides of the check. Fig. 2 is a face view of one side of the check.

1 represents the check, each face of which is divided into three parts 2, 3, 4,—the central portion 3 being to receive a certain arrangement of designations of fractional parts of the total value of the check as hereinafter explained. The block or space 2 at one end of the check is designated to receive a number to be applied by the postmaster, and the name of the device, viz,—"Postal check",—is designated in the space 2. Below the name or title of the device, in the space 2, appears the contract portion of the check, which may be stated in any suitable language. In the space 4 at the lower end of check, certain instructions may be printed. The bottom space 4 on the other face of the check contains the same information except as to the amounts for which this face or side of the check may be issued. The arrangement of the matter in the spaces 2 and 4 may be varied both in style and wording, so long as the substance of the contract and instructions is preserved.

In the drawing, I have illustrated a postal check having a total value of 50 cents, although it will be understood that the check may be made to represent any desired value and fractional parts thereof.

The intermediate space 3 on the side of check represented in Fig. 2, is divided by horizontal perforated severing lines 5, into twenty-five narrow spaces extending transversely of the check. These spaces contain figures from 1 to 25 arranged consecutively near both edges of the check. The value of each of these spaces is also indicated in words,—for instances, in the first space, the words "one cent" appears. On the other side of the check, represented in Fig. 1, all the matter thereon, is arranged, the reverse to the matter on the side of the check shown in Fig. 2.

On the side of the check shown in Fig. 1, the intermediate portion 3, is divided into twenty-six transverse spaces and contain figures arranged consecutively from 25 to 50 near both margins of the check, and words printed in the intermediate portions of said transverse spaces, indicate the value in cents of the figures in said spaces. In arranging the transverse spaces on the side shown in Fig. 1 the first space having a designated value of 25 cents will be opposite a blank space on the other side of the check below the space having a designated value of 25 cents, and the remaining spaces on the side shown in Fig. 1 will have designated values consecutively to 50 cents,—the latter being directly opposite the space on the other side of the check having a designated value of one cent.

Assuming that the user has purchased one or more checks from the Post Office Department, and he desires to transmit 35 cents to a correspondent,—he will take a check with the side shown in Fig. 1 facing him, and sever the same on the perforated severing line immediately under the figures and words thirty-five cents and send the severed check containing the contract portion to his correspondent, who will have it cashed at any post office. The remaining portion of the check will have a value represented by the highest amount remaining on the other side,—viz,—on the side shown in Fig. 2, the remaining amounts on the side which has been used and which contains a contract portion, being canceled. Thus in the example given, the remaining portion of the check will have a value of 15 cents, this being the difference between the full value of the check (50 cents) and the amount (35 cents) which has been used. This remaining 15 cent check containing a contract portion can be used at any future time.

It is apparent that a postal check can be issued by a postmaster for any amount within the total value of the check, by severing the same in the manner before explained,—the remaining portion of the check being still good for the amounts which it represents to be sold to another customer, or it may be canceled by the postmaster and returned to the Department with his report.

Having fully described my invention what I claim as new and desire to secure by Letters-Patent is,—

A check having on each face a contract portion and a series of value designations, the value designations on one face being different from and registering with those on the other face, except that the series of value designations upon one face of the check begins with the same number with which the series of value designations on the obverse face of the check ends, and ends in a position out of register with the last value designation on said obverse face, the arrangement of said contract portion and value designations on one side of the check being reverse to the corresponding arrangement on the other side.

In testimony whereof, I have signed this specification in the presence of two subscribing witnesses.

JOHN C. BELL.

Witnesses:
R. S. FERGUSON,
W. CLARENCE DUVALL.